June 21, 1949. G. ANNESLEY 2,473,697
PROPELLER
Filed May 26, 1944 8 Sheets-Sheet 5
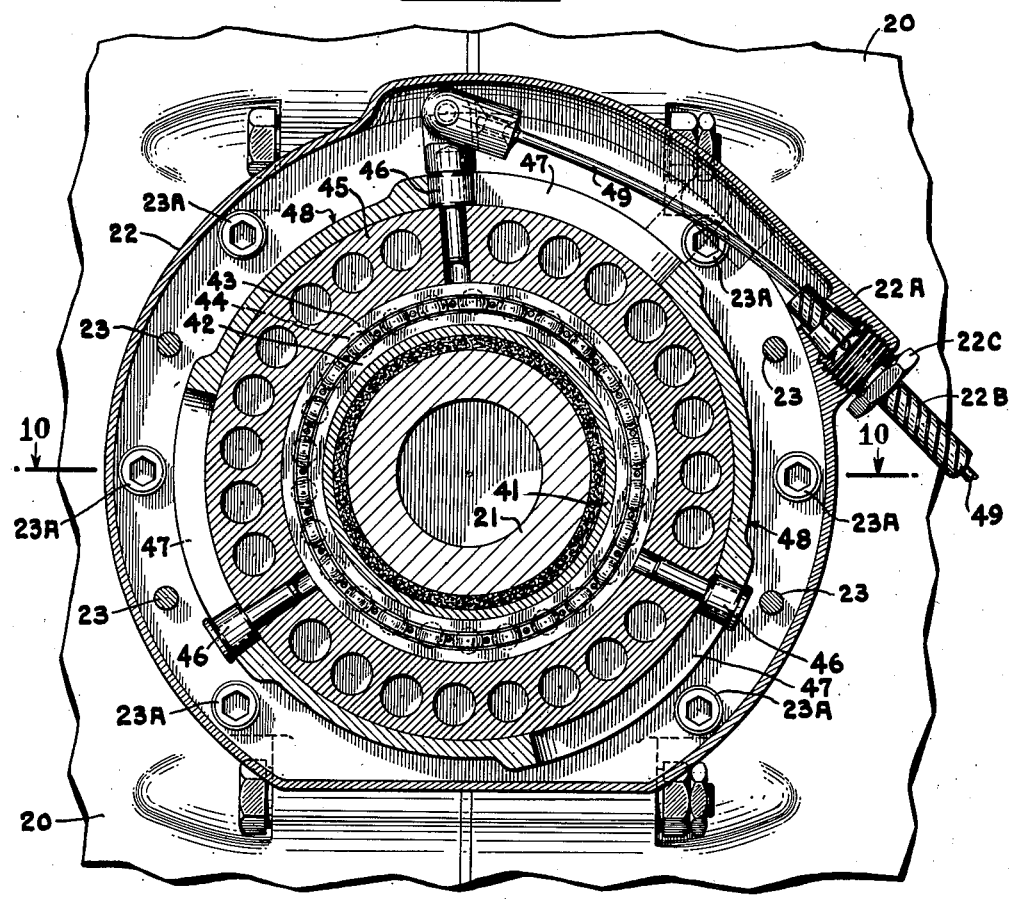
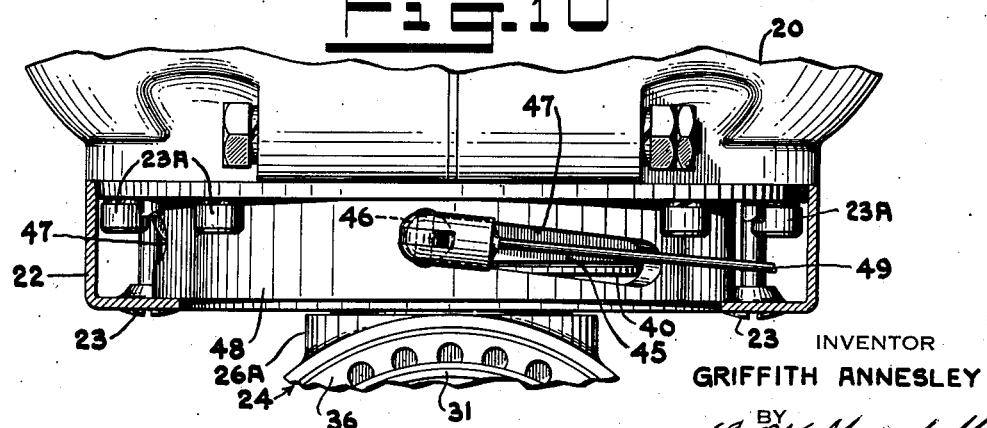
INVENTOR
GRIFFITH ANNESLEY
BY
E. W. Marshall
ATTORNEY

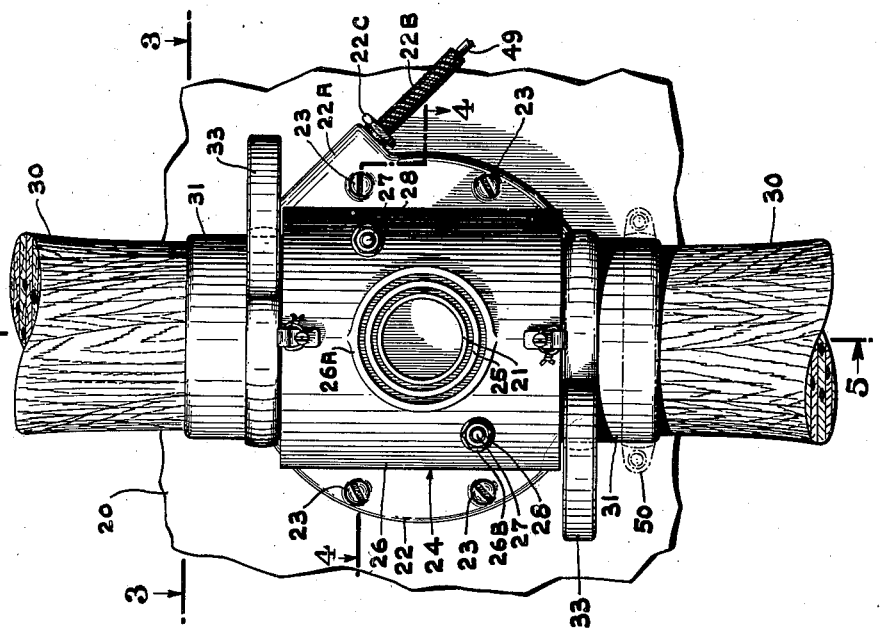
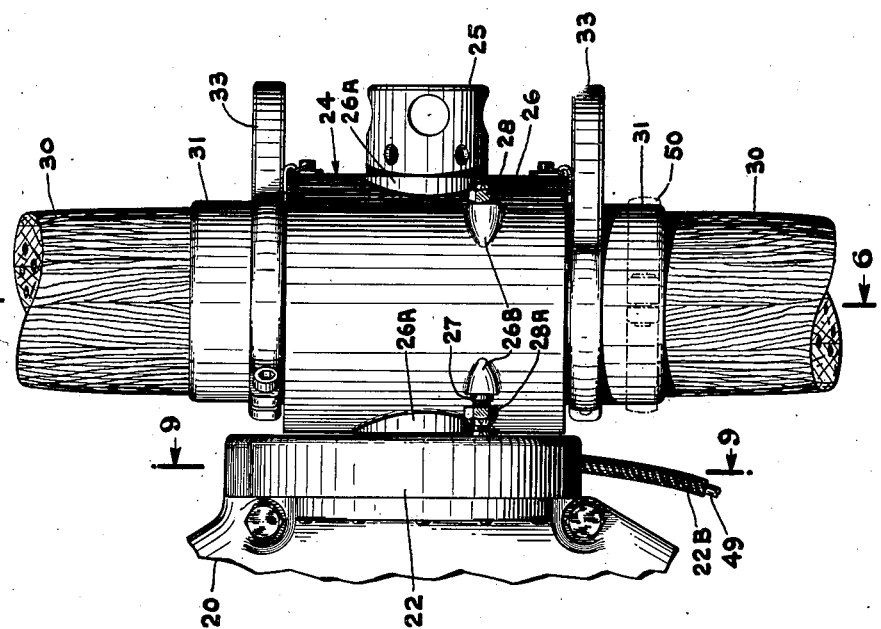

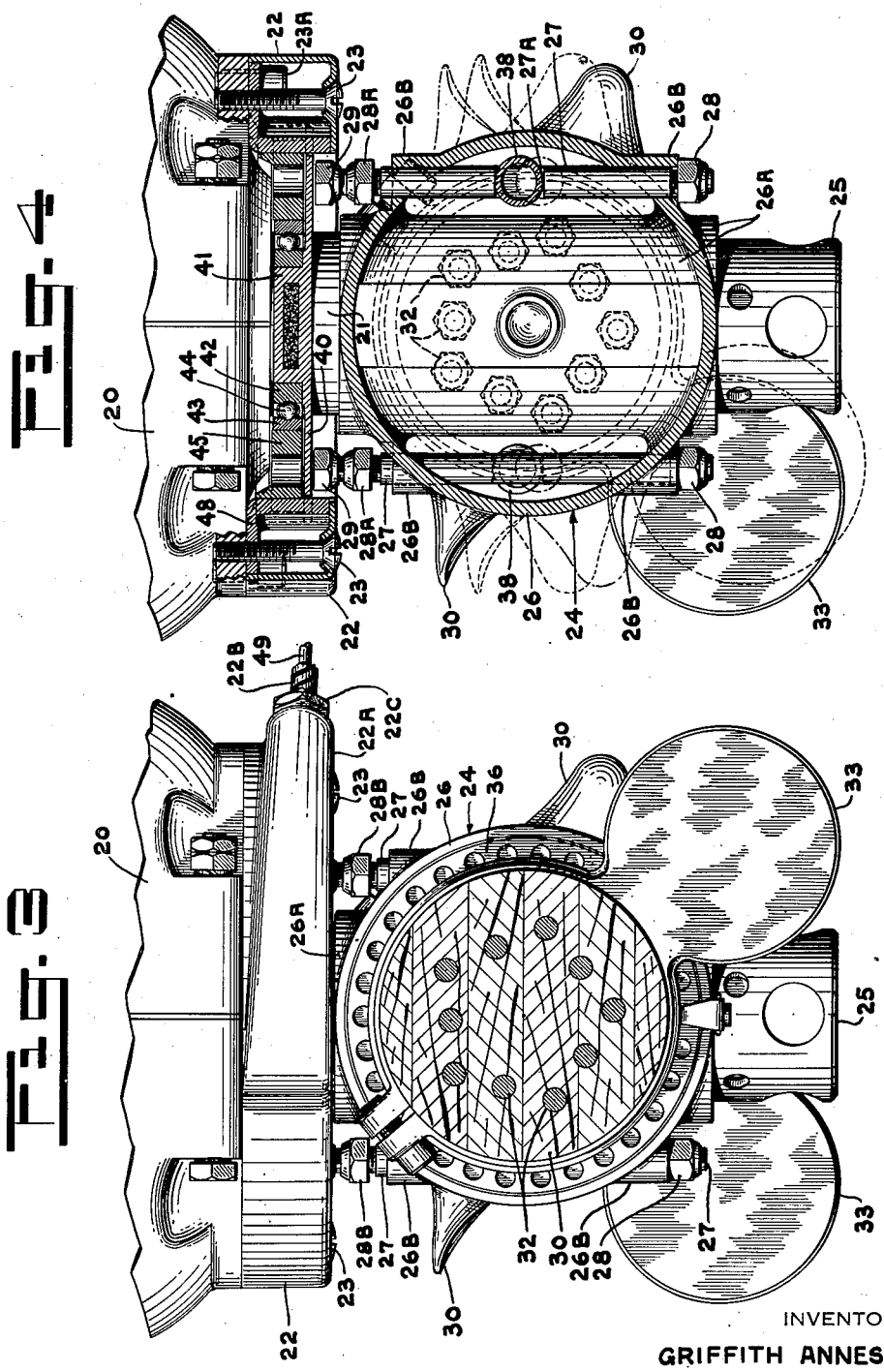

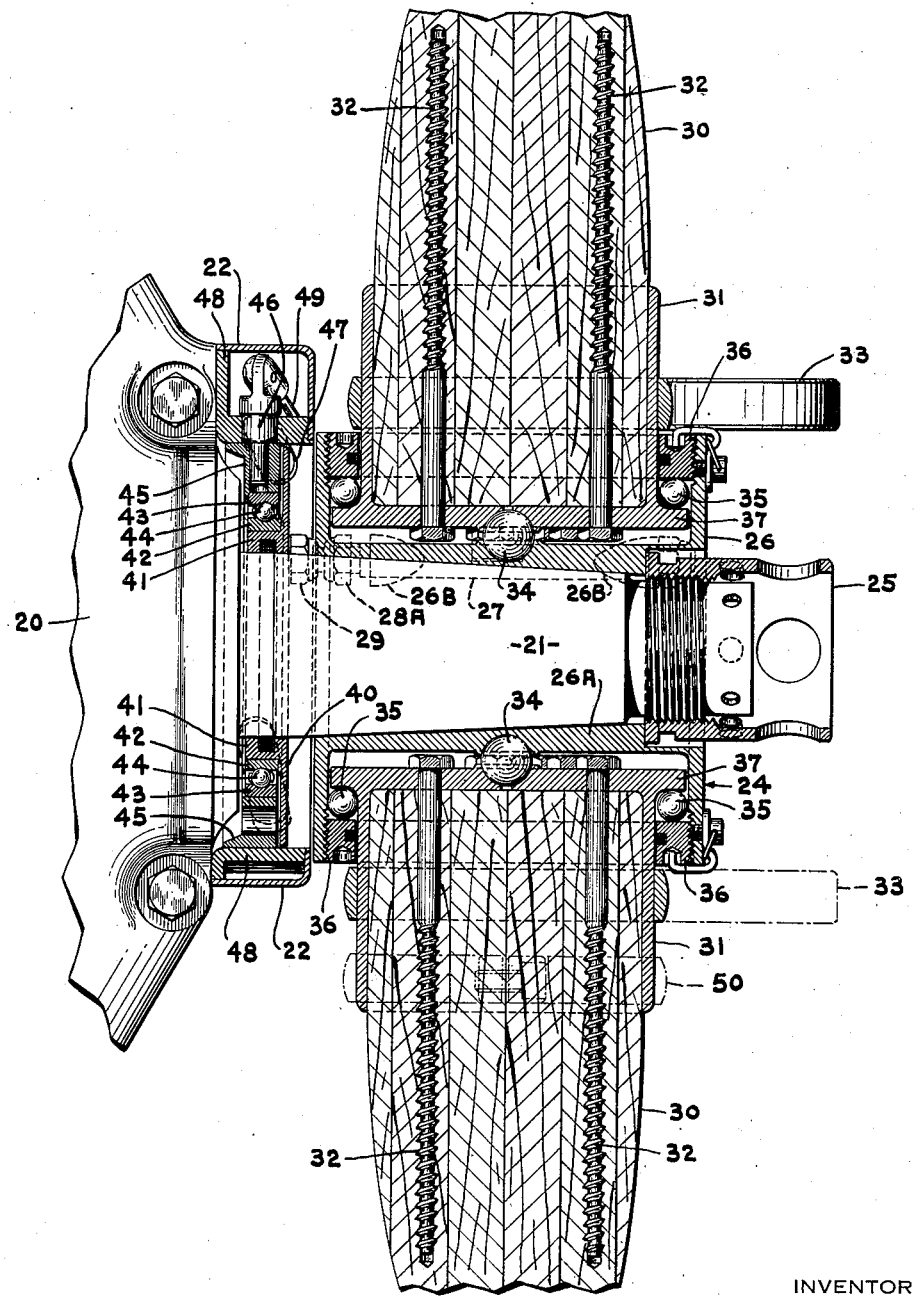

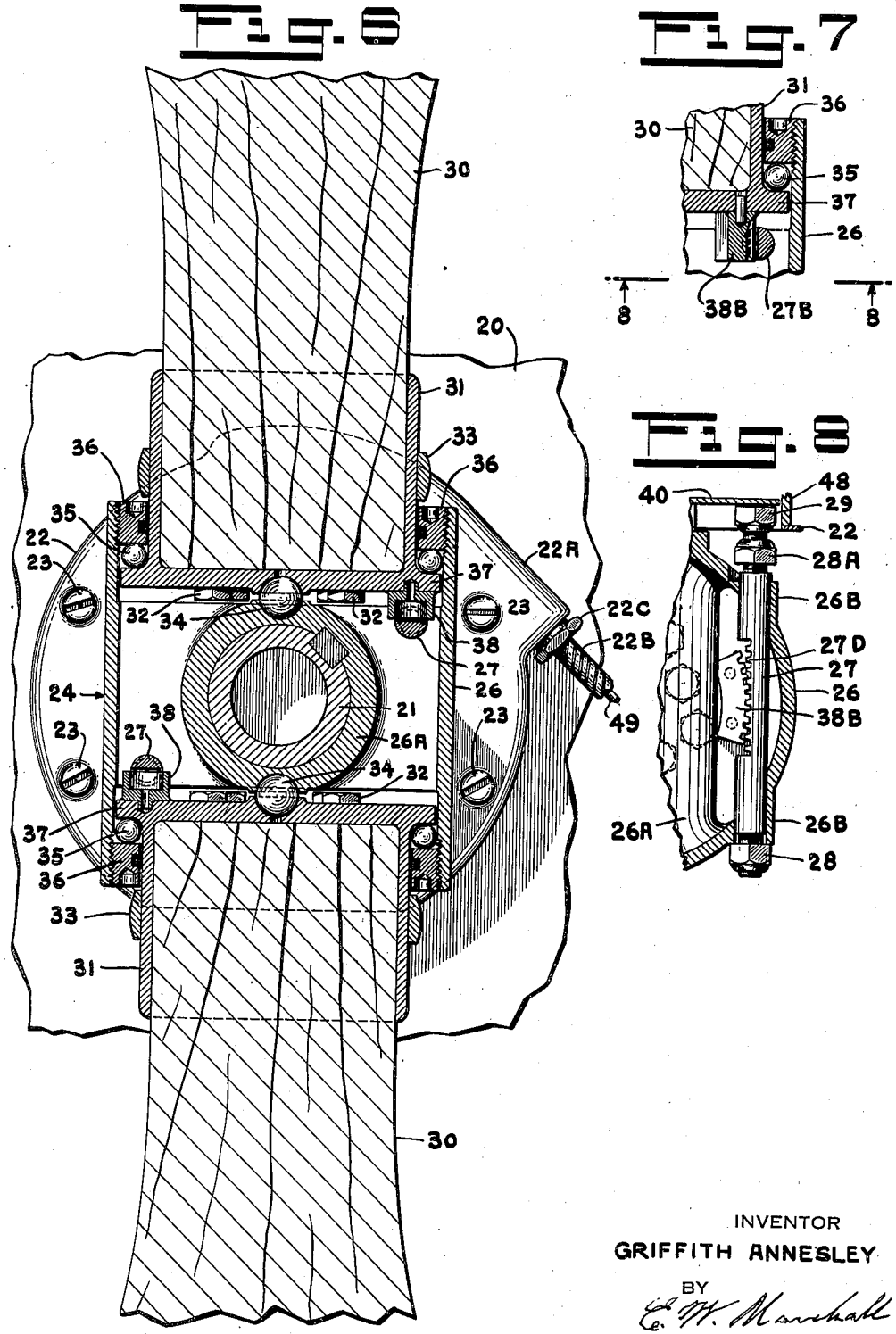

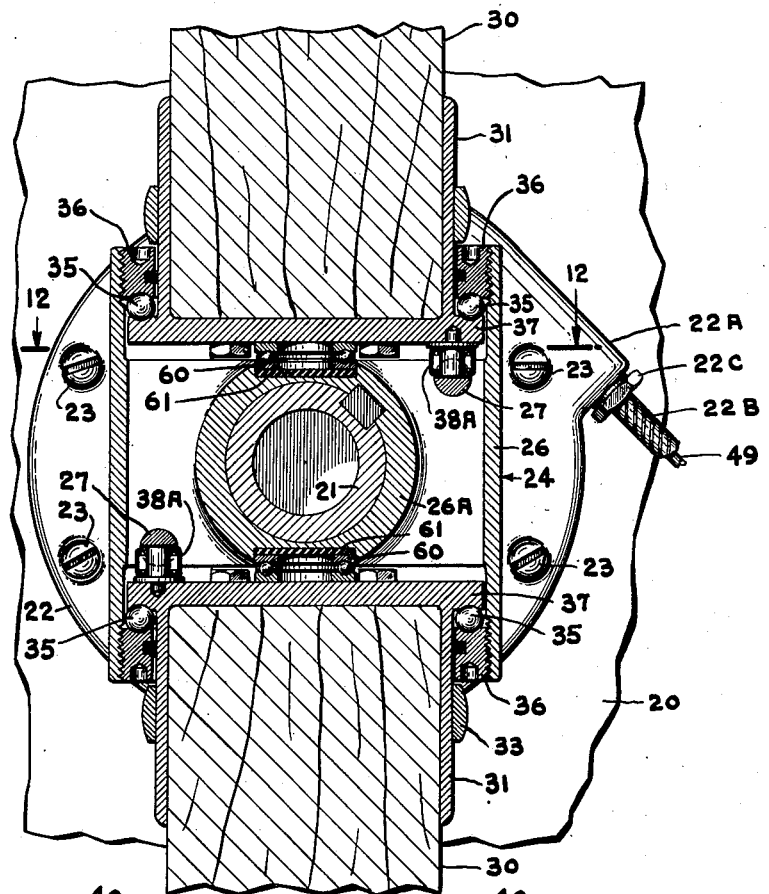
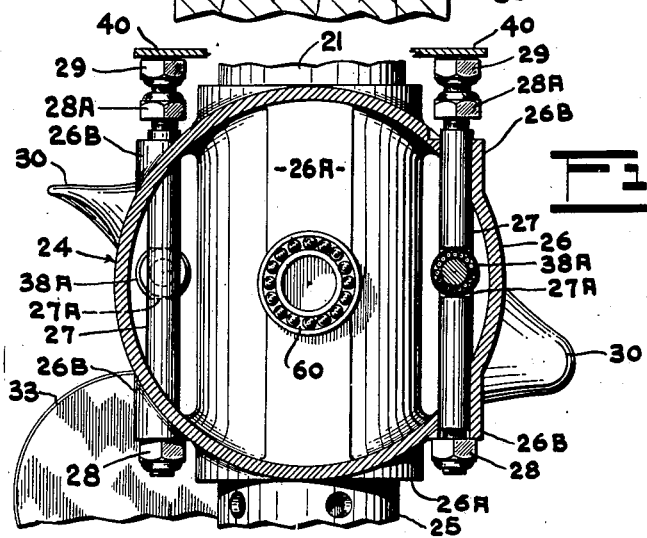

June 21, 1949. G. ANNESLEY 2,473,697
PROPELLER
Filed May 26, 1944 8 Sheets-Sheet 7
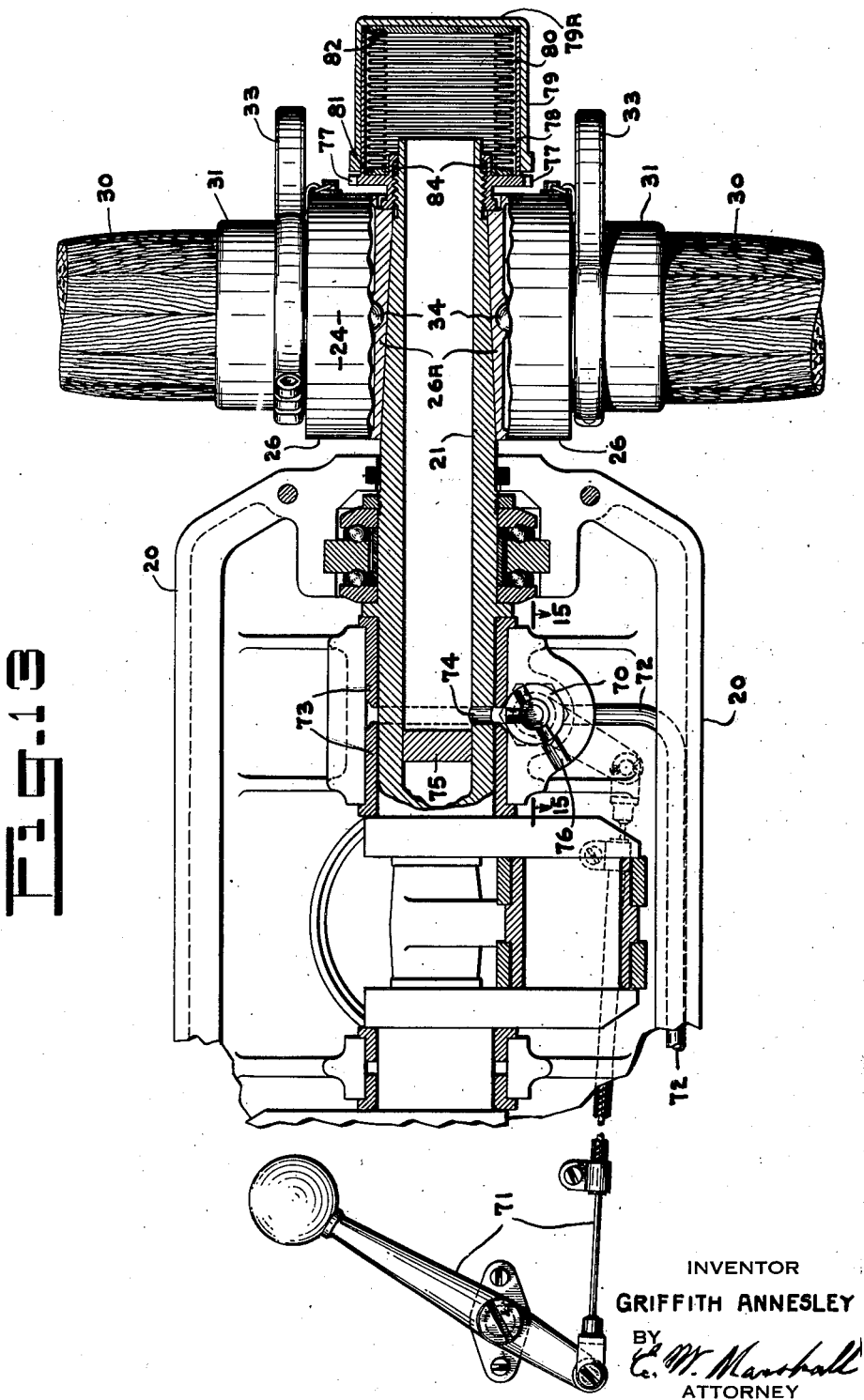
INVENTOR
GRIFFITH ANNESLEY
BY
E. W. Marshall
ATTORNEY June 21, 1949. G. ANNESLEY 2,473,697
PROPELLER
Filed May 26, 1944 8 Sheets-Sheet 8
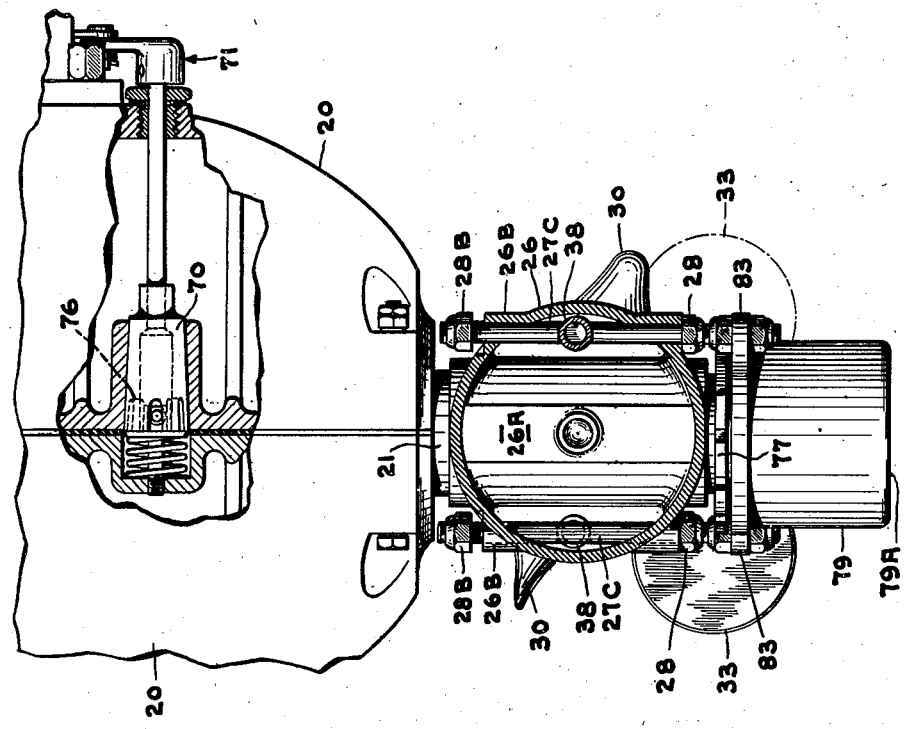
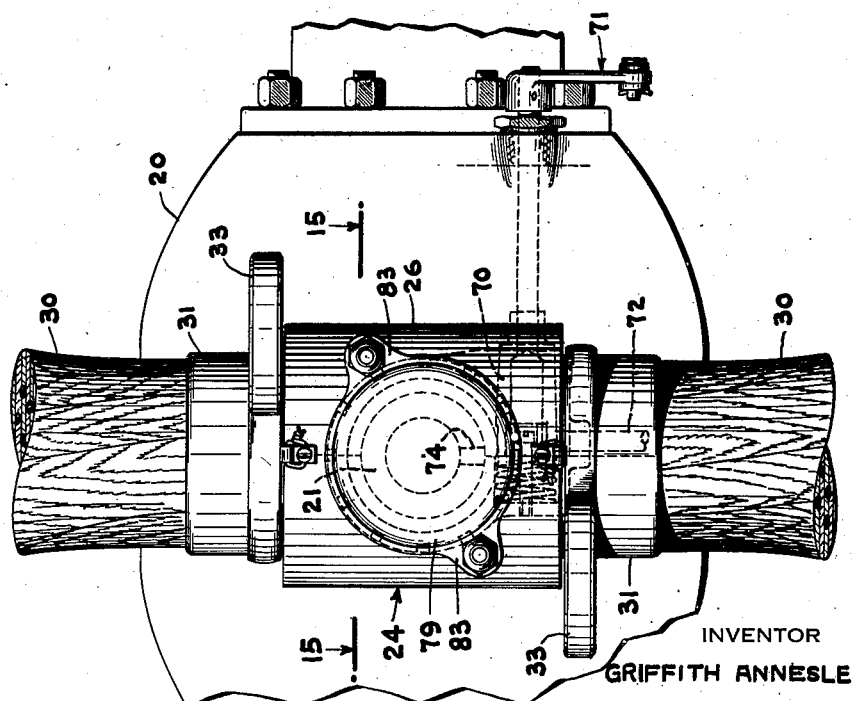
INVENTOR
GRIFFITH ANNESLEY
BY
E. W. Marshall
ATTORNEY Patented June 21, 1949

2,473,697

UNITED STATES PATENT OFFICE 2,473,697

PROPELLER

Griffith Annesley, New York, N. Y.

Application May 26, 1944, Serial No. 537,386

6 Claims. (Cl. 170—160.47)

1

My invention relates to propellers and especially to the variable pitch type used on aircraft. Its object is to improve the mechanism and to provide a simple and effective arrangement for supporting the propeller blades and for adjusting their pitch while they are in motion. In carrying out the invention I have devised arrangements which simplify the construction and provide a balance of the parts which results in reducing the applied force needed to make desired adjustments to a minimum. The improvements I have made appear in the following specification and the novel features thereof are set forth in the appended claims.

Referring to the drawings:

Figure 1 is a side elevation of a mechanism which is made according to and embodies the present invention and also shows a part of the casing of an airplane motor to which parts of the mechanism are attached.

Fig. 2 is a front elevation of the parts shown in Fig. 1.

Fig. 3 is a cross sectional elevation of the parts shown in the preceding figures, the section being taken on the line 3—3 of Fig. 2.

Fig. 4 is a similar cross sectional elevation with the section taken on the line 4—4 of Fig. 2.

Fig. 5 is a central sectional view on an enlarged scale of the parts shown in the preceding figures. In this view the section is taken on the line 5—5 of Fig. 2.

Fig. 6 is a sectional front elevation of the mechanism shown in Fig. 1, the section being taken on the line 6—6 of the latter figure.

Fig. 7 is a sectional elevation of a modification of a part of the structure illustrated in Fig. 6.

Fig. 8 is a sectional plan of the part of the adjusting mechanism shown in Fig. 7 looking in the direction of the arrows, 8, 8 in Fig. 7.

Fig. 9 is a sectional front elevation on a still larger scale of some of the parts shown in Fig. 1, the section being taken on the line 9—9 of Fig. 1.

Fig. 10 is a top plan view of the parts shown in Fig. 9 with a part of the stationary housing broken away on the line 10—10 of Fig. 9, to more clearly show the construction.

Fig. 11 is a sectional front elevation similar to that shown in Fig. 6 showing a modified arrangement for mounting the propeller blade ferrules.

Fig. 12 is a sectional plan view of the arrangement shown in Fig. 11. The section is taken on the line 12—12 of Fig. 11.

Fig. 13 is a side elevation, partly in section, of a modification of the pitch adjusting mechanism.

2

Fig. 14 is a front elevation of the modification shown in Fig. 13, and,

Fig. 15 is a sectional plan view of the arrangement shown in Figs. 13 and 14. The section in the lower part of this figure is taken on the line 15—15 of Fig. 14. The upper part of this shows the engine casing broken away on a section on the line 15—15 of Fig. 13 to show the valve mechanism.

20 designates a motor casing from the front of which a hollow shaft 21 extends through a stationary housing 22 which is affixed to the motor casing by screws 23 and through a rotatable hub 24 which is keyed to the motor shaft and affixed thereto by a nut 25.

The hub 24 preferably is constructed of a hollow cylindrical tube 26, the ends of which are internally threaded. A transverse bore is made through the tube intermediate its ends and another tube 26A which is bored to fit the motor shaft is inserted therein and welded or brazed thereto. Lugs 26B are also welded or brazed to the tube 26 to form bearings for slidable actuating rods 27.

30 designates the propeller blades. These are rigidly affixed to bearing ferrules 31 in a suitable manner, such for example by lag screws as shown in Fig. 5. Counterweights 35 are adjustably affixed to the ferrules 31. The ferrules 31 are rotatively mounted on the hub 24. In the construction illustrated in Figs. 5, 6 and 7, balls 34 are seated in semispherical pockets in the tube 26A of the hub 24 and the closed ends of the ferrules 31 in alinement with the common axis of the blades 30. This centers the ferrules and blades.

The ends of the tube 26 extend over flanges 37 which extend outwardly from the bases of the ferrules. Balls 35 are interposed between the ferrules 31 and the extending portions of the tubes 26 with clearance. Retaining rings 36 are adjustably engaged with the threads in the ends of the tube 26. The balls 35 are seated between the flanges 37 of the ferrules 31 and the rings 36 and are retained between outer walls of the ferrules 31 and the inner surface of the tube 26. This arrangement holds the propeller blades onto the hub 24 against centrifugal action but permits them to be rotated therein. The ferrules may be formed of sections of a tube welded or brazed to circular plates which close their inner ends and form the flanges 37.

In order to effect angular adjustment of the ferrules 31 in the hub 24 to change the effective pitch of the propeller blades 30, circular pivot pins 38 are affixed to the inner closed ends of the ferrules at points eccentric to their axes. These engage transverse notches 27A in the actuating rods 27 which are parallel to the motor shaft 21 and these rods are slidably mounted in the lugs 26B of the hub 24. The counter-weights 33 tend to move the propeller blades to their high pitch position as viewed in Fig. 4. Their movement in this direction is limited by nuts 28 on the forward end of the rods 27. Adjustable nuts 29 on the rear ends of the rods 27 are adjusted in position to clear a movable disk 40 within the stationary housing 22. Nuts 28A also on the rods 27 limit their movement in the opposite direction.

Another construction of this same purpose is shown in Figs. 11 and 12 in which pin bearings 38A affixed to the inner surfaces of the ferrules 31 project into the transverse notches 27A in the rods 27.

A still further modification is shown in Figs. 7 and 8 in which teeth 27D are formed in the rods 27B which engage toothed sectors 35B affixed to the ferrules 31.

The disk 40 has a hub 41 which is slidably mounted on the motor shaft 21. (See Figs. 3, 4, 5, 9 and 10.) It is also free to rotate with the shaft. In the hub 41 is an oil retaining packing. 42 is the inner race of a ball bearing. This tightly engages the outer periphery of the hub 41. 43 is an outer race. Balls 44 are interposed between the races 42 and 43.

The outer race 43 is driven into the inner periphery of the actuating plate 45 which is capable of helical and longitudinal adjustment. Its longitudinal movement is imparted to the disk 40 through the engagement of the balls 44 with the races 42 and 43.

Rollers 46 are rotatively mounted on pivots which extend radially from the adjusting plate 45. These rollers are in oblique slots 47 in a stationary cam member 48 which limits the helical movement of the actuating plate 45 and imparts the desired longitudinal movement to it and to the disk 40. The cam member is affixed to the motor casing 20 by screws 23A. This mechanism is enclosed within the housing 22 to which is affixed a boss 22A and in which is suitably fastened a flexible tubing 22B by means of the collet 22C. A flexible wire 49 is shown attached to one of the roller pivots as a means for manually moving the plate 45 from a convenient remote station.

The operation of this mechanism is obvious. When the disk 40 is fully retracted, that is moved back to its position nearest the motor casing 20, the propeller blades may move automatically to their positions of maximum pitch. This is effected, as has been said, by the counterweights 33. The nuts 29 are adjusted to clear the disk 40, when the propeller blades are in this position, so that there is then no engagement of the parts of the propeller mounting and the adjusting mechanism. When the operator moves the disk 40 forwardly it engages the nuts 29 and moves the rods 27. These rods rotate the propeller blades about their common axis but in opposite directions, to any extent desired by the operator, limited by the position of the nuts 28A. Several adjusted positions of the propeller blades are illustrated in Fig. 4. The position of the counterweights on the ferrules 31 is adjustable so that their effect may be as little as necessary to produce their desired function. Thus a delicate balance of the parts may be attained and only a slight pressure is needed to move the disk 40. The disk 40 is free to rotate around the motor shaft on the balls 44 and such rotation is imparted to it by the engagement of the nuts 29. Thus there is no frictional resistance between the disk 40 and the nuts 29.

Delicate balance of the propeller blades may be enhanced by the use of the device shown in dot and dash lines in Figs. 1, 2 and 5. This is a split ring 59 of some appreciable weight surrounding one of the ferrules 31 and affixed thereto at a desired distance from the axis of the motor-shaft. This distance is adjustable and increasing it adds to the balanced weight of the blade to which it is applied. Obviously such adjustable weights may be applied to both of the propeller blades. This is especially useful in case of the replacement of a broken blade.

In Figs. 11 and 12 thrust ball bearings 60 are interposed between the ferrules 31 and the tube 26A of the hub 24. These are seated in diametrically opposed circular pockets in the hub in which are compressible pads 61 of rubber or the like. They are capable of limited transverse movement on the closed ends of the ferrules. With this construction the rings 36 may be screwed in somewhat more tightly than they can be when balls 34 are used, as shown in Figs. 5, 6 and 13, because of the resiliency of the pads.

The ball races in this case, formed in the flanges 37 and the retaining rings 36 are grooved to center the ferrules 31 and blades 30 in the hub 24. Pin roller bearings 38A engage the notches 27A in the rod 27.

An arrangement for actuating the pitch adjusting mechanism hydraulically is illustrated in Figs. 13, 14 and 15. In this case 70 designates a valve controlled by manually actuated mechanism 71. This valve 70 has ports which in one position of the valve open communication between a conduit 72 from an oil pressure supply such as that of the motor lubrication system to the inside of the hollow motor shaft 21, through a space between stationary bushings 73 and a port 74 through the shaft. The shaft is closed back of the port 74 by a plug 75. In another position of valve 70 it opens communication between the inside of shaft 21 and an exhaust port 76 as shown in Fig. 13.

In this case the nut 77 which holds the hub 24 on the motor shaft has a hollow cylindrical portion 78 extending forwardly therefrom. 79 is a cylindrical shell slidably mounted on the cylinder 78. This shell has a closed end 79A. An expansible bellows 80 or the like is interposed between the nut 77 and the closed end of the shell 79. Its inner end is open to the inside of the motor shaft and its outer end is closed. Plates 81, 82 are welded or brazed to the ends of the bellows 80. The rear plate 81 is welded, brazed or soldered to the inner surface of the nut 77.

As seen in Figs. 14 and 15, diametrically opposed lugs 83 extend from the rear end of the shell 79. The propeller pitch adjusting rods 27C are affixed to these lugs. A packing 84 is interposed between the nut 77 and the shaft 21.

When oil under pressure is admitted to the expansible bellows 80, the shell 79 is forced outwardly. This moves the rods 27C forwardly and adjusts the propeller blades against the action of the counterweights in the manner previously described. The movement of the rods 27C is limited by nuts 28B and 28.

Various modifications in construction, mode of operation, method and use of an invention may and do occur to others, especially after benefitting from knowledge of such disclosure as that herein presented of the principles involved, but the invention itself is not confined to the present showing.

I claim:

1. A ferrule having an open outer end adapted to receive the end of a propeller blade, combined with a hub having a bore adapted to fit a motor shaft and a bearing for rotatively supporting said ferrule on an axis normal to the axis of the bore, a longitudinally movable rod wholly within and parallel to the bore in the hub connected to the ferrule at a point spaced from its axis of rotation, means comprising a stop on the end of the rod engageable with said hub for limiting the movement of the rod in one direction, a counterweight affixed eccentrically to the ferrule arranged to move the rod longitudinally in said one direction, a disk freely rotatable on the motor shaft beyond the end of the rod and normally disengaged therefrom, and means for moving the disk into engagement with the rod to impart longitudinal movement to the rod in the opposite direction.

2. In the combination of a motor shaft and a hub from which a plurality of propeller blades extend radially and are mounted for angular adjustment about axes normal to that of the motor shaft and in which hub slidable actuating rods connected with the propeller blades are mounted in substantial parallelism with the motor shaft, a disk having a hub longitudinally movable on the motor shaft and a transverse surface, a helically adjustable actuating plate, a stationary cam member having a slot oblique to said surface of the disk, the adjustable actuating plate having a radial extension engaging the slot whereby helical movement of said plate imparts a longitudinal movement thereto, a bearing between the plate and the disk arranged to transmit the longitudinal movement of the plate to the disk to bring the disk into cooperative relation with the actuating rods.

3. In the combination of a motor shaft and a hub from which a plurality of propeller blades extend radially and are mounted for angular adjustment about axes normal to that of the motor shaft and in which hub slidable actuating rods connected with the propeller blades are mounted in substantial parallelism with the motor shaft, a disk having a hub longitudinally movable on the motor shaft and a transverse surface, a helically adjustable actuating plate, a stationary cam member having a plurality of angularly spaced slots of definite length oblique to said surface of the disk, angularly spaced pivots extending radially from the adjustable plate, rollers on said pivots and in said slots whereby angular movement of said plate imparts a limited longitudinal movement thereto, an anti-friction bearing between the plate and the disk arranged to transmit the longitudinal movement of the plate to the disk to bring the disk into cooperative relation with the actuating rods.

4. In the combination of a motor shaft and a hub from which a plurality of propeller blades extend radially and are mounted for angular adjustment about axes normal to that of the motor shaft and in which hub slidable actuating rods connected with the propeller blades are mounted in substantial parallelism with the motor shaft, a disk having a hub longitudinally movable on the motor shaft and a transverse surface, a helically adjustable actuating plate, a stationary cam member having a plurality of angularly spaced slots of definite length oblique to said surface of the disk, angularly spaced pivots extending radially from the adjustable plate, a flexible actuating wire attached to one of the pivots, rollers on said pivots and in said slots whereby angular movement of said plate imparts a limited longitudinal movement thereto, an anti-friction bearing between the plate and the disk arranged to transmit the longitudinal movement of the plate to the disk to bring the disk into cooperative relation with the actuating rods.

5. In the combination of a motor shaft and a hub from which a plurality of propeller blades extend radially and are mounted for angular adjustment about axes normal to that of the motor shaft and in which hub slidable actuating rods connected with the propeller blades are mounted in substantial parallelism with the motor shaft and in which the propeller blades automatically move the actuating rods in one direction, a transverse disk longitudinally movable on the motor shaft, a helically adjustable actuating plate, a stationary member having cam surfaces oblique to the surface of the disk engaging the adjustable plate whereby angular movement of said plate imparts a longitudinal movement thereto, a bearing between the plate and the disk arranged to transmit the longitudinal movement of the plate to the disk to bring the disk into cooperative relation with the actuating rods to move said rods in the opposite direction.

6. In the combination of a motor shaft and a hub from which a plurality of propeller blades extend radially and are mounted for angular adjustment about axes normal to that of the motor shaft and in which hub slidable actuating rods connected with the propeller blades are mounted in substantial parallelism with the motor shaft, adjustable counterweights on the propeller blades whereby the propeller blades automatically move the actuating rods in one direction, a disk having a hub longitudinally movable on the motor shaft and a transverse surface, a helically adjustable actuating plate, a stationary cam member having a plurality of angularly spaced slots of definite length oblique to said surface of the disk, angularly spaced pivots extending radially from the adjustable plate, a flexible actuating wire attached to one of the pivots, rollers on said pivots and in said slots whereby angular movement of said plate imparts a limited longitudinal movement thereto, an anti-friction bearing between the plate and the disk arranged to transmit the longitudinal movement of the plate to the disk to bring the disk into cooperative relation with the actuating rods to move said rods in the opposite direction.

GRIFFITH ANNESLEY.

REFERENCES CITED

The following references are of record in the file of this patent:

UNITED STATES PATENTS

| Number | Name | Date |
| --- | --- | --- |
| Re. 20,283 | Caldwell | Mar. 9, 1937 |
| 1,301,052 | Hart et al. | Apr. 15, 1919 |
| 1,366,074 | Hart et al. | Jan. 18, 1921 |
| 1,403,775 | Hart | Jan. 17, 1922 |
| 1,519,163 | Parker | Dec. 16, 1924 |
| 1,608,755 | McCauley et al. | Nov. 30, 1926 |
| 1,668,971 | McCauley | May 8, 1928 |
| 1,801,725 | Cook | Apr. 21, 1931 |

(Other references on following page)

| Number | Name | Date | Number | Name | Date |
|---|---|---|---|---|---|
| 1,832,335 | Thomas | Nov. 17, 1931 | 2,316,482 | Williams | Apr. 13, 1943 |
| 1,890,932 | Briner | Dec. 13, 1932 | 2,341,207 | Carol | Feb. 8, 1944 |
| 1,995,312 | Larason | Mar. 26, 1935 | | | |
| 2,001,189 | Fletcher | May 14, 1935 | | FOREIGN PATENTS | |
| 2,032,255 | Caldwell | Feb. 25, 1936 | Number | Country | Date |
| 2,233,468 | Barthel et al. | Mar. 4, 1941 | 75,370 | Germany | May 28, 1894 |
| 2,240,873 | Thomas | May 6, 1941 | 138,143 | Great Britain | Feb. 5, 1920 |
| 2,281,456 | Roby | Apr. 28, 1942 | 333,471 | Germany | Jan. 29, 1932 |
| 2,290,196 | Martin et al. | July 21, 1942 | 343,777 | Great Britain | Feb. 26, 1931 |
| 2,296,987 | Emmons | Sept. 29, 1942 | 682,174 | Germany | Sept. 21, 1939 |
| 2,304,153 | DiCesare | Dec. 8, 1942 | | | |
| 2,313,301 | Ratie et al. | Mar. 9, 1943 | | | |